US006684237B1

(12) United States Patent
Preissman (10) Patent No.: US 6,684,237 B1
(45) Date of Patent: Jan. 27, 2004

(54) NETWORK INTERFACE THROTTLING MECHANISMS AND METHODS

(75) Inventor: Steven M. Preissman, Moorestown, NJ (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/172,957

(22) Filed: Oct. 14, 1998

(51) Int. Cl.⁷ .............................................. G06F 13/00
(52) U.S. Cl. ....................................................... 709/200
(58) Field of Search .............................. 370/409; 709/1, 709/100, 102–104, 200, 218, 219, 222, 225, 226, 229, 250; 714/48, 49; 710/100, 320

(56) References Cited

U.S. PATENT DOCUMENTS

| | | | | | |
|---|---|---|---|---|---|
| 5,448,702 A | * | 9/1995 | Garcia, Jr. et al. | ........... | 710/100 |
| 6,000,003 A | * | 12/1999 | Allen et al. | ................. | 710/320 |
| 6,009,077 A | * | 12/1999 | Firoiu et al. | ................ | 370/230 |
| 6,134,678 A | * | 10/2000 | Mahalingam et al. | ......... | 714/48 |

* cited by examiner

Primary Examiner—Robert B. Harrell
(74) Attorney, Agent, or Firm—Beyer, Weaver & Thomas, LLP.; Mary R. Olynick, Esq.

(57) ABSTRACT

Methods and apparatus are disclosed for enabling a first one of a plurality of interfaces associated with a router. In one aspect of the invention, a method is disclosed. The first interface is enabled when a first predefined operating condition is met. In one alternative embodiment, the first predefined operating condition is met when the first interface has been disabled for at least a programmable predefined minimum time. In another embodiment, the first predefined operating condition is met when the first interface device has been disabled for more than a programmable predefined maximum time. In yet another embodiment, the first predefined operating condition is met when a programmable predefined amount of processing resources are available for implementing a plurality of processes on the network router. In yet another alternative embodiment, the first predefined operating condition is met when a predefined amount of memory resources are available for implementing a plurality of processes on the network router.

35 Claims, 5 Drawing Sheets

NETWORK INTERFACE THROTTLING MECHANISMS AND METHODS

BACKGROUND OF THE INVENTION

The present invention relates generally to network routers that are coupled with one or more interface device(s). More specifically, the present invention relates to method and apparatus for reactivating an interface device after it has been deactivated.

A conventional router is typically coupled to various interface devices. These interface devices may be any suitable interface device for communicating with the router. By way of examples, the interface devices may include an ethernet interface, a token ring interface, a serial interface, or a high speed FDDI interface. One embodiment of a router that may be employed with the present invention is further described below with reference to FIG. 5.

Additionally, a conventional router typically includes a processor (e.g., a CPU). The processor may be utilized to implement various local processes associated with the router. For example, the processor may be used to implement a scheduler that schedules and implements various local processes on the router. These local processes take the form of various tasks within the router such as manipulating and interpreting data packets that are received and transmitted by the router.

The local processes that are implemented by the router typically include packet processing procedures. For example, security processes may be implemented on received packets to check whether the packet is authorized to access its intended destination. By way of another example, quality of service processes may also be implemented on received packets to determine a priority for each received packet. That is, some packets may be routed immediately while others are held until high priority packets are routed. Additionally, the local processes may implement various network protocols, such as various layer protocols.

The scheduler of the router is also responsible for scheduling the various local processes. For example, the scheduler determines when to execute each of the local processes. The local processes may be scheduled to execute consecutively. Two or more processes may also be executed in parallel.

For various reasons, one or more interface devices that are coupled to the router may have to be deactivated. For example, resources used by the router may have become overloaded. By way of specific example, the processor's resources may be insufficient to handle all of the local processes that have been scheduled by the scheduler. In other words, the processor may not have enough processing time or memory resources to execute all of the scheduled local processes.

Figure 1:
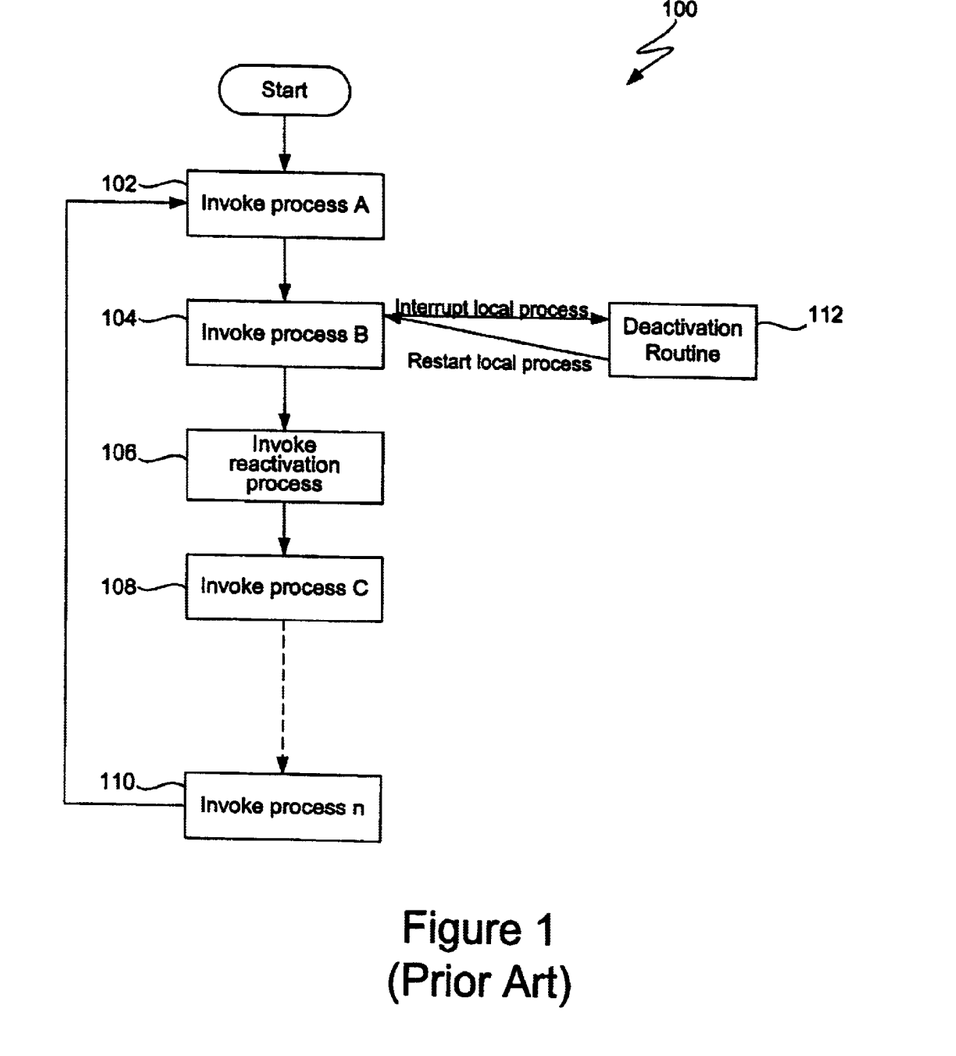
FIG. 1 is a flowchart illustrating a conventional scheduler procedure that invokes a plurality of local processes on a network router.

FIG. 1 is a flowchart illustrating a conventional scheduler procedure 100 that invokes a plurality of local processes on a network router. The scheduler procedure 100 is in the form of a continuous loop. After the router is reset or enabled, one or more local processes are invoked in operations 102 through 110. That is, several local processes may be scheduled to occur one after the other. For example, a first process may include receiving a data packet, and a second process may include performing various manipulation or interpretation processes on the received data packet. Alternatively, two or more local processes may be scheduled to execute in parallel.

The local processes include various data manipulation and management tasks. By way of specific example, a process may include performing a security check on a received data packet, determining priority of routing the data packet, implementing various flow based routing procedures, and/or determining where to route the data packet. A local process may implement various network protocols, such as asynchronous transfer mode (ATM), X.25, switched multimegabit data service (SMDS), and SNTP, and internet protocol (IP).

As shown, local process A is invoked in operation 102, and process B is then invoked in operation 104. In other words, the scheduler procedure includes scheduling process A and then process B. Process A is initiated and completed, and then process B is initiated. In this example, process B is then interrupted by the deactivation routine 112. The deactivation routine may be part of another interrupt routine that includes other processing in addition to a deactivation process. Although the deactivation routine is shown as interrupting process B, of course, it may interrupt any local process (e.g., processes A through n). After the deactivation routine is completed, process B is restarted at operation 104.

After process B is completed, any devices that were deactivated by the deactivation routine 112 may be reactivated in a reactivation process 106. In other words, the reactivation process 106 is typically scheduled and initiated by the scheduler. That is, as soon as the scheduler procedure 100 reaches the reactivation process 106, the interface device is immediately enabled.

When the scheduler procedure 100 reaches the reactivation process 106, the interface device is automatically activated without determining whether it is efficient to reactivate the interface device. In sum, the reactivation process 106 is blindly implemented when the scheduler procedure 100 reaches operation 106.

Any number of local processes are invoked before and/or after the reactivation process 106. As shown, after the reactivation process 106 is invoked, a process C is invoked, and then any number of processes are invoked until a last process n is invoked in operation 110. The entire scheduler procedure is then repeated in operations 102 through 110. In such local processes are scheduled and initated (e.g., invoked by the scheduler), and these local processes will include a reactivation process that automatically enables any deactivated interface devices.

Although this conventional reactivation approach works well under certain conditions, it has associated disadvantages. That is, since a deactivated interface device is automatically reactivated when the scheduler procedure 100 reaches the reactivation process 106, the interface device may be reactivated before the router is ready. For example, the router may not have enough resources to handle processes associated with the reactivated interface device. Under these circumstances, the reactivated interface device will probably be immediately deactivated.

In view of the foregoing, there is a need for a reactivation mechanism and technique that more efficiently reactivates an interface device after it has been deactivated Specifically, there is a need for a technique and apparatus for reactivating an interface device after determining whether certain operating conditions are met, such as whether there are enough available resources.

SUMMARY OF THE INVENTION

Accordingly, the present invention provides apparatus and methods for activating a deactivated interface device associated with a router. In general terms, the present invention provides systems and methods for determining when to reactivate the interface device based on one or more operating parameters. In other words, the interface device is not reactivated until one or more predetermined conditions are analyzed and met.

In one embodiment, a method for enabling a first one of a plurality of interfaces associated with a router is disclosed. The first interface is enabled when a first predefined operating condition is met. In one specific embodiment, the first predefined operating condition is met when the first interface has been disabled for at least a programmable predefined minimum time. In another embodiment, the first predefined operating condition is met when the first interface device has been disabled for more than a programmable predefined maximum time. In yet another embodiment, the first predefined operating condition is met when a programmable predefined amount of processing resources are available for implementing a plurality of processes on the router. In yet another alternative embodiment, the first predefined operating condition is met when a predefined amount of memory resources are available for implementing a plurality of processes on the router.

In another method aspect, several operating conditions are checked before the interface is reactivated. In this method, it is determined whether the interface has been deactivated for more than a predefined minimum time. If it is determined that the interface has been deactivated for more than the predefined minimum time, it is determined whether the interface has been deactivated for more than a predefined maximum time. The interface is activated if it is determined that the interface has been deactivated for more than a predefined maximum time. If the interface has not been deactivated for more than a predefined maximum time, it is determined whether the processing or memory resources associated with the router are overloaded. The interface device is activated if it is determined that the processing and memory resources are not overloaded.

In an apparatus aspect of the present invention, a router is disclosed. The router includes a plurality of interfaces arranged to control data communication between the router and other network devices, a processing unit arranged to implement processes associated with the router, and a memory device arranged to facilitate the processes of the processing unit. The processing unit itself includes a scheduler for scheduling and executing processes associated with the interface devices, a disabling mechanism that is arranged to disable the first interface device when a first operating condition associated with the router is met, and an enabling mechanism that is arranged to enable the first interface device when a second operating condition associated with the router is met and after the first interface has been disabled by the disabling mechanism.

In another embodiment, an operating system software for use by a processor in directing operation of a router is disclosed. The operating system software includes at least one processor-readable medium and a program mechanism embedded in the at least one processor-readable medium for causing the processor to enable a first one of a plurality of interfaces associated with the router when a first predefined operating condition is met.

The present invention has many advantages. For example, the present invention allows efficient reactivation of disabled interface devices since reactivation is based on whether one or more operating conditions are met. For example, when an interface device is deactivated due to resource overload, it will not be reactivated when resources are still overloaded (unless it is determined that another interface is to be deactivated instead). That is, the interface device is not reactivated and then immediately deactivated as may occur in conventional reactivation procedures. Thus, local processes are not inefficiently interrupted to again deactivate the reactivated interface device. In sum, the interface device is only reactivated after one or more conditions are analyzed and met, which technique results in efficient utilization of processing resources.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 2:
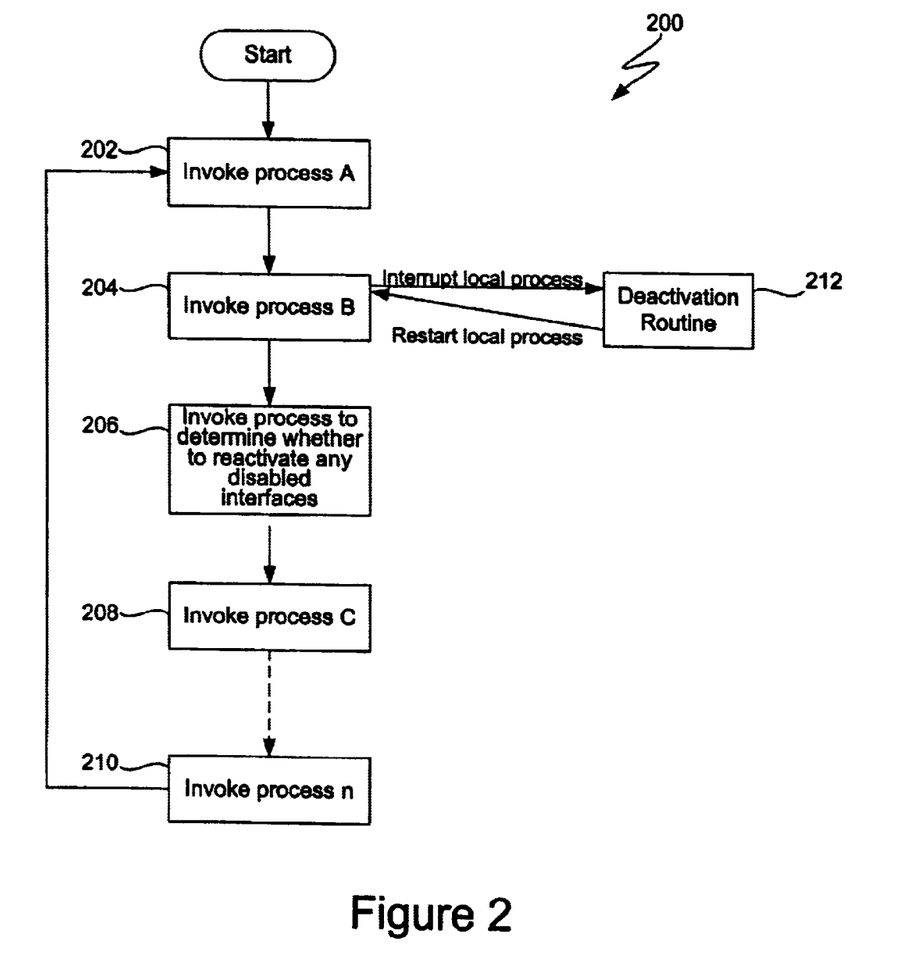
FIG. 2 is a flowchart illustrating a scheduler procedure of a router in accordance with one embodiment of the present invention.

FIG. 2 is a flowchart illustrating a scheduler procedure 200 of a router in accordance with one embodiment of the present invention. As shown, the scheduler procedure 200 includes the invocation of a plurality of processes 204 through 210. Each invocation of a particular process may include scheduling as well as initiating the particular process. In sum, the scheduler procedure 200 is in the form of a loop procedure that is continuously scheduling and initiating these processes until an interrupt occurs. For example, an interrupt may occur causing a particular interface device to be deactivated. As shown, an interrupt routine 212 for deactivating one or more interface devices interrupts process 204.

Alternatively, the procedure 200 may incorporate a deactivation process. That is, the deactivation routine is inserted as a process within the procedure 200. However, the deactivation routine 212 is typically implemented within an interrupt routine that interrupts the processes of procedure 200 since one or more interface devices need to be deactivated as soon as a problem occurs. For example, when resources are overloaded, one or more of the interface devices needs to be immediately deactivated to free up resources for use by local processes. Thus, since the currently running local process will likely not have enough resources to continue, it is interrupted to deactivate one or more of the interface devices, such that resources are freed.

The local processes (e.g., process 202 through 210) of the scheduler procedure 200 of the router include, for example, individual procedures for handling data packets and performing management routines. Local processes may be scheduled consecutively, in parallel, or any combination thereof. The scheduler procedure 200 also includes a reactivation process 206 for determining whether to reactivate any disabled interface devices that have been disabled (e.g., by the deactivation routine 212). In other words, the reactivation process 206 may be implemented on one or more deactivated interface devices.

Reactivation process 206 may be implemented anywhere within the scheduler procedure 200 or within a background process that runs concurrently with the local processes. For example, reactivation may occur prior to scheduling of the local process 202. Alternatively, the determination of reactivation 206 may occur after process 208 or 210. In other words, a deactivated interface device may be reactivated at any point after, prior to, or concurrently with any of the local processes of the router or scheduler of the router.

The local processes include various data manipulation and management tasks. By way of specific example, a local process may include performing a security check on a received data packet, determining priority of routing the data packet, implementing various flow based routing procedures, and/or determining where to route the data packet. A local process may implement various network protocols, such as asynchronous transfer mode (ATM), X.25 switched multimegabit data service (SMDS), and SNTP, and internet protocol (IP).

Figure 3:
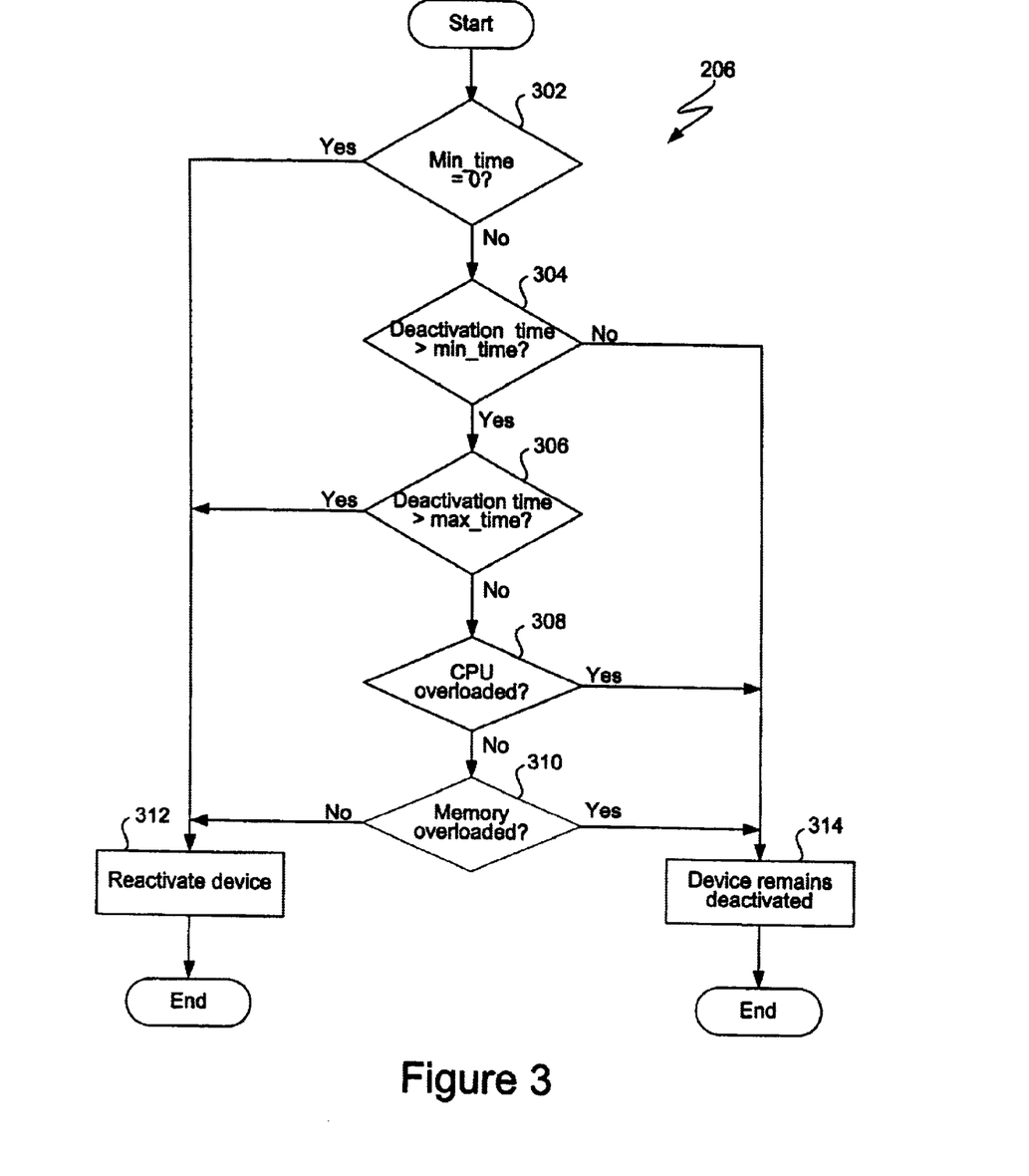
FIG. 3 is flowchart illustrating the process of FIG. 2 of determining whether to reactivate a disabled interface device in accordance with one embodiment of the present invention.

FIG. 3 is flowchart illustrating the process 206 of FIG. 2 of determining whether to reactivate a disabled interface device in accordance with one embodiment of the present invention. The reactivation process 206 includes one or more determination procedures for checking operating conditions. In other words, at least one operating parameter or condition associated with a router is checked before reactivating a disabled interface device. Although several operating parameters are illustrated in FIG. 3, the present invention may include one or more of these operating parameters in various combinations, or may include additional operating parameters not illustrated in FIG. 3. Additionally, although the operating conditions are described as being checked in a particular order, the conditions may be checked in any order. Also, if there is more than one disabled interface device, operating conditions may be checked to determine whether to reactivate one, some, or all of the disabled interface devices.

In one embodiment, it is determined whether a predefined minimum time parameter has been set to zero in operation 302. The minimum time parameter represents the minimum time that the interface device has been deactivated before reactivation occurs. When the minimum time parameter has been set to zero, it may be implied that immediate reactivation of the interface device is desired without determining whether any other conditions are met. Thus, the process 206 proceeds to operation 312, and the interface device is reactivated. By checking whether the minimum time parameter is set to zero, the present invention allows the interface device to be reactivated in a conventional manner. In other words, the interface device may be reactivated almost as soon as the scheduling procedure reaches the reactivation process 206 of FIG. 2.

However, if immediate reactivation is not desired, the minimum time parameter will not be set to zero. The process 206 will then proceed to operation 304, and it is determined whether the interface device has been deactivated for more than the predefined minimum time. This determination operation 304 allows the interface device to be deactivated for at least a minimum time before further determination procedures are implemented to decide whether to reactive the interface device. For example, when memory is overloaded, it may be overloaded for a minimum time before processes can empty the memory to make it available for other processes associated with the deactivated interface device. When the memory is overloaded for this minimum time, the interface device should not be reactivated. Thus, for this minimum time, it is not necessary to determine whether the memory or processing resources are overloaded so that the interface device may be reactivated. In sum, processing resources may be efficiently utilized by setting this minimum time parameter such that minimum resource overload periods are taken into account.

If the interface device has not been deactivated for the minimum time, the device remains deactivated in operation 314. However, if the interface device has been disabled for more than the minimum time, the process 206 proceeds to operation 306, and it is determined whether the interface device has been deactivated for more than a predefined maximum time parameter. This operation 306 allows reactivation of the interface device even when resources are currently overloaded.

Other interfaces may then be deactivated to alleviate resource overload. In other words, determination operation 306 allows interface devices to share down time. That is, a single interface device is not disabled the entire time period that resources are overloaded. For example, a heavily used router may frequently experience resource overload. The interface device that is deactivated first in response to the overload does not have to remain inactive for the entire overload period. The disabled interface device may be reactivated after a maximum time so that other interface devices may be deactivated instead. In sum, when the interface device has been deactivated for more than the maximum time, the interface device is enabled in operation 312.

If the interface device has not been deactivated for more than the maximum time, it is then determined whether the processor of the router is overloaded in operation 308. This operation 308 may be implemented in any suitable manner for determining when the processor is overloaded. For example, a predefined processor parameter may be set to a value that indicates a particular percentage of unavailable processor resources. The predefined processor parameter may then be compared with the current or last known percentage of unavailable processor resources. If the currently or last known percentage of unavailable processor resources is greater than the predefined processor parameter, it is then determined that there are not enough available resources for reactivating the interface device. However, if the percentage of unavailable processor resources is not greater than the predefined processor parameter, it is then determined that there are enough processor resources.

Alternatively, the predefined processor parameter may be set to a value that indicates a particular percentage of available processor resources. The predefined processor parameter may then be compared with the current or last known percentage of available processor resources. If the currently or last known percentage of available processor resources is less than the predefined processor parameter, it is then determined that there are not enough available resources for reactivating the interface device. If the currently or last known percentage of available processor resources is not less than the predefined processor parameter, it is then determined that there are enough processor resources.

If the processor is overloaded the device remains deactivated in operation 314. However, if the processor is not overloaded it is then determined whether the memory is overloaded in operation 310. This operation 310 may be implemented in any suitable manner for determining when memory resources are overloaded. For example, a predefined memory parameter may be set to a value that indicates a minimum amount of available memory resources. One or more memory parameters may defined for each memory resource, which depends on how the memory resources are partitioned. For example, a main memory parameter and a fallback memory parameter may be defined for a main memory storage area and a fallback memory storage area, respectively.

Figure 4:
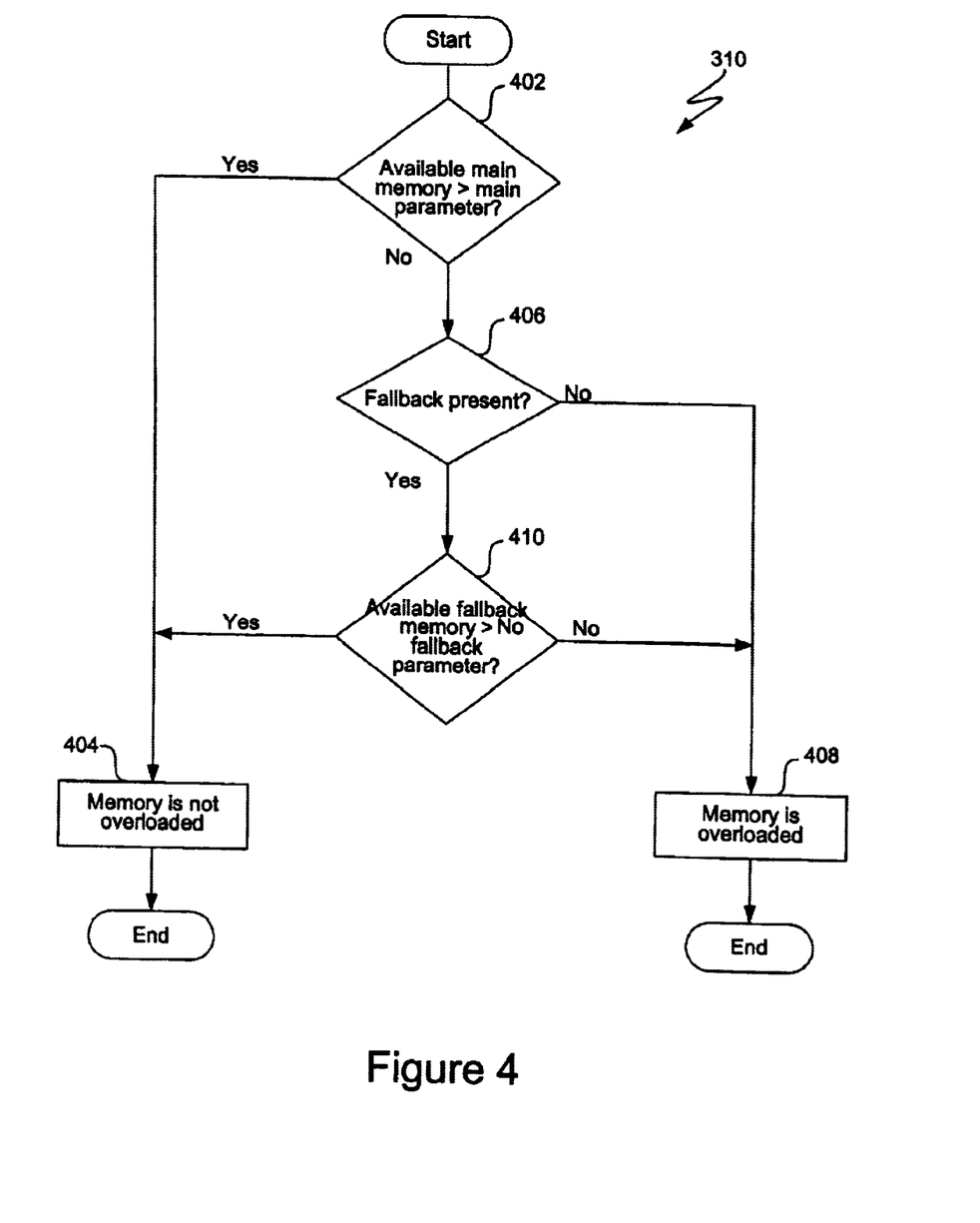
FIG. 4 is a flowchart illustrating the operation of FIG. 3 of determining whether enough memory resources are available in accordance with one embodiment of the present invention.

FIG. 4 is a flowchart illustrating the operation 310 of FIG. 3 of determining whether enough memory resources are available in accordance with one embodiment of the present invention. In this embodiment, a main memory area is available, and a fallback memory area may be available when the main memory area is full. Initially, it is determined whether the amount of available main memory area is greater than the predefined main memory parameter in operation 402. If enough main memory area is available, it is determined that memory resources are not overloaded in operation 404.

If the available main memory area is not greater than the predefined main memory parameter, it is then determined whether a fallback memory area is present or available in operation 406. If a fallback memory area is not available or present, it is determined that the memory is overloaded in operation 408. However, if a fallback memory area is available, it is then determined whether the available fallback memory area is greater than the predefined fallback parameter.

If enough fallback resources are available, it is determined that the memory resources are not overloaded in operation 404. In contrast, if the available fallback memory resources are not greater than the predefined fallback parameter, it is determined that the memory is overloaded in operation 408. Returning to figure 3, if it is determined that the memory is overloaded, the interface devices remains deactivated in operation 314. If the memory is not overloaded the interface device is reactivated in operation 312.

The predefined parameters (e.g., minimum deactivation time, maximum deactivation time, unavailable processor percentage, and available memory) may be preset to constant values or programmable on the fly. For example, an interrupt routine may be implemented to halt local processes and set the predefined operating parameters. Alternatively, the predefined parameters may be hard coded or set during initialization of the scheduler procedure 200.

Figure 5:
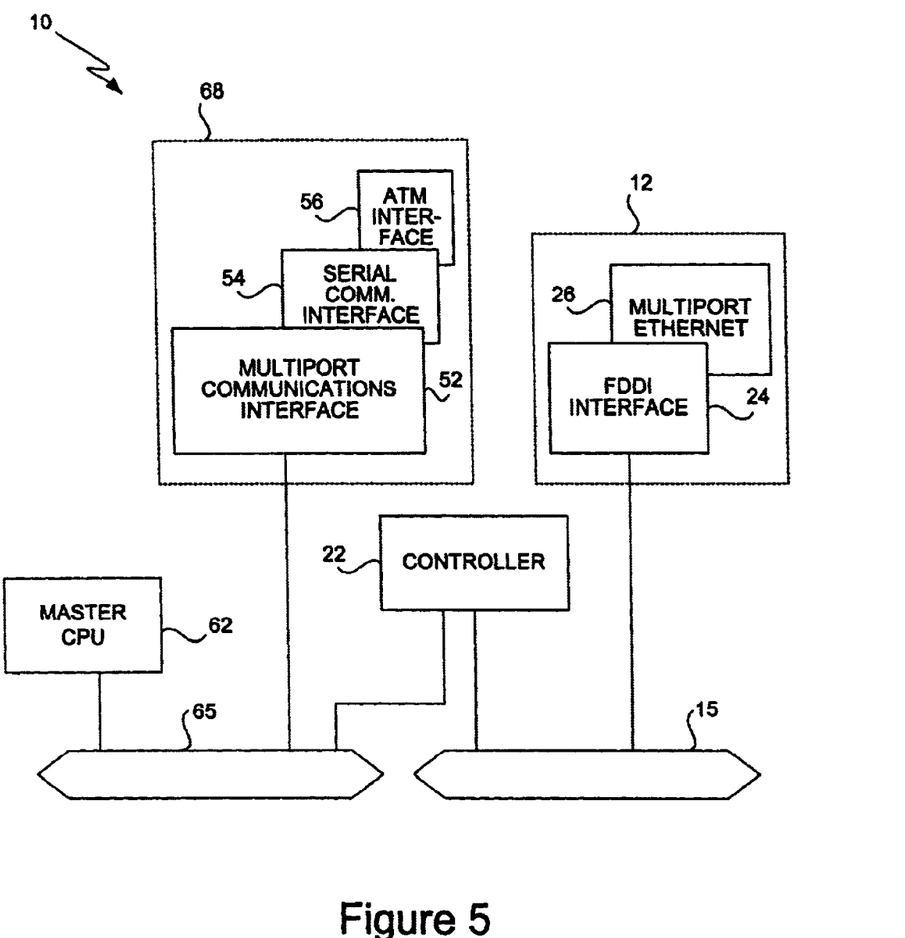
FIG. 5 is a diagrammatic representation of a router in accordance with one embodiment of the present invention.

In one embodiment, the scheduler procedures of the present invention (e.g., procedure 200) are implemented on a router as shown in FIG. 5. Referring now to FIG. 5, a router 10 of the present invention includes a master central processing unit (CPU) 62, low and medium speed interfaces 68, and high speed interfaces 12. In some embodiments, the CPU 62 is responsible for such router tasks as routing table computations and network management. It may include one or more microprocessor chips selected from complex instruction set computer (CISC) chips, reduced instruction set computer (RISC) chips, or other available chips. In one embodiment, non-volatile RAM and/or ROM also form part of CPU 62. However, there are many different ways in which memory could be coupled to the system.

The techniques of the present invention may be implemented within software that is stored within memory that is associated with this router system. In one embodiment, operating system software may be implemented for use with the CPU 62 of router 10. The operating system software implements or includes process 206 for determining whether to reactivate one or more of the interfaces 52 and 68 of router 10, which operating system software and associated procedure 200 are executed by CPU 62.

The interfaces 12 and 68 are typically provided as interface cards. Generally, they control the sending and receipt of data packets over the network and sometimes support other peripherals used with the router 10. The low and medium speed interfaces 68 include a multiport communications interface 52, a serial communications interfaces 54, and an asynchronous transfer mode (ATM) interface 56. The high speed interfaces 12 include an FDDI interface 24 and a multiport ethernet interface 26. In one embodiment, each of these interfaces (low/medium and high speed) includes (1) a plurality of ports appropriate for communication with the appropriate media, and (2) an independent processor and in some instances (3) volatile RAM. The independent processors control such communications intensive tasks as packet switching and filtering, and media control and management. By providing separate processors for the communications intensive tasks, this architecture permits the master microprocessor 62 to efficiently perform routing computations, network diagnostics, security functions, etc.

The low and medium speed interfaces are coupled to the master CPU 62 through a data, control, and address bus 65. High speed interfaces 12 are connected to the bus 65 through a fast data, control, and address bus 15 which is in turn connected to a bus controller 22. The bus controller functions are provided by a processor.

Although the present invention is described as being implemented on the router of FIG. 5, this router is by no means the only router architecture on which the present invention can be implemented. For example, an architecture having a single processor that handles communications as well as routing computations, etc. would also be acceptable. Further, other types of interfaces and media could also be used with the router.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for enabling a first one of a plurality of interfaces associated with a router comprising:

determining when a first predefined operating condition is met, wherein the first predefined operating condition is met when it is determined that the first interface has been disabled for a predefined time; and enabling the first interface when the first predefined operating condition is met, wherein the first predefined operating condition is met when it is determined that the first interface has been disabled for a predefined time and when a predefined amount of processing resources are available for implementing a plurality of processes on the router.

2. A method as recited in claim 1, wherein the first predefined operating condition is met when the first interface has been disabled for at least a predefined minimum time.

3. A method as recited in claim 2, further comprising:

determining when a second predefined operating condition is met, wherein the second predefined operating condition is met when the first interface has been disabled for at least a predefined maximum time; and enabling the first interface when the first and the second predefined operating conditions are met.

4. A method as recited in claim 3, further comprising:

determining when a third predefined operating condition is met, wherein the third predefined operating condition is met when a predefined amount of resources associated with the router are available for implementing a plurality of processes associated with the router; and enabling the first interface when the first, the second and the third predefined operating conditions are met.

5. A method as recited in claim 4, wherein the resources are selected from a group consisting of processing and memory resources.

6. A method as recited in claim 2 wherein the predefined minimum time is programmable.

7. A method as recited in claim 1, wherein the first predefined operating condition is met when the first interface device has been disabled for more than a predefined maximum time.

8. A method as recited in claim 7, further comprising:

determining when a second predefined operating condition is met, wherein the second predefined operating condition is met when a predefined amount of resources associated with the router are available for implementing a plurality of processes associated with the router; and enabling the first interface when the first and the second predefined operating conditions are met.

9. A method as recited in claim 8, wherein the resources are selected from a group consisting of processing and memory resources.

10. A method as recited in claim 7, wherein the predefined maximum time is programmable.

11. A method as recited in claim 1, wherein the predefined amount of processing resources is programmable.

12. A method as recited in claim 1, further comprising:

scheduling a plurality of processes on the router, each process being associated with at least one of the interfaces; and initiating the plurality of processes.

13. A computer readable medium containing program instructions for enabling a first one of a plurality of interfaces associated with a router comprising:

computer readable code for determining when a first predefined operating condition is met, wherein the first predefined operating condition is met when it is determined that the first interface has been disabled for a predefined time; and computer readable code for enabling the first interface when the first predefined operating condition is met, wherein the first predefined operating condition is met when it is determined that the first interface has been disabled for a predefined time and when a programmable first predefined amount of processing resources are available for implementing a plurality of processes on the router.

14. A computer readable medium as recited in claim 13, wherein the first predefined operating condition is met when the first interface has been disabled for at least a programmable predefined minimum time.

15. A computer readable medium as recited in claim 14, further comprising:

computer code for determining when a second predefined operating condition is met, wherein the second predefined operating condition is met when the first interface has been disabled for at least a predefined maximum time; and computer code for enabling the first interface when the first and the second predefined operating conditions are met.

16. A computer readable medium as recited in claim 15, further comprising:

computer code for determining when a third predefined operating condition is met, wherein the third predefined operating condition is met when a predefined amount of resources associated with the router are available for implementing a plurality of processes associated with the router; and computer readable code for enabling the first interface when the first, the second and the third predefined operating conditions are met.

17. A computer readable medium as recited in claim 13, wherein the first predefined operating condition is met when the first interface device has been disabled for more than a programmable predefined maximum time.

18. A computer readable medium as recited in claim 17, further comprising:

computer code for determining when a second predefined operating condition is met, wherein the second predefined operating condition is met when a predefined amount of resources associated with the router are available for implementing a plurality of processes associated with the router; and computer readable code for enabling the first interface when the first and the second predefined operating conditions are met.

19. A method for activating an interface that is coupled to a router having an associated processing unit and an associated memory device, the method comprising the acts of:

determining whether the interface has been deactivated for more than a predefined minimum time;

determining whether the interface has been deactivated for more than a predefined maximum time if it is determined that the interface has been deactivated for more than the predefined minimum time;

activating the interface if it is determined that the interface has been deactivated for more than a predefined maximum time;

determining whether processing or memory resources associated with the router are overloaded if the interface has not been deactivated for more than a predefined maximum time; and activating the interface device if it is determined that the memory device and the processing unit are not overloaded.

20. A method as recited in claim 19, wherein determining whether the memory resources associated with the router are overloaded includes:

determining whether an available amount of a first storage area within the memory resources is greater than a predefined memory parameter; and if the available amount of the first storage area is greater a than predefined memory parameter, determining that the memory resources are not overloaded.

21. A method as recited in claim 20, wherein if the available amount of the first storage area is not greater than a predefined memory parameter, determining whether the memory resources associated with the router are overloaded further includes:

determining whether a second storage area is available within the memory resources;

if the second storage area is available, determining whether an available amount of the second storage area within the memory resources is greater than the predefined memory parameter;

if it is determined that the available amount of the second storage area is not greater than the predefined memory parameter, determining that the memory resources are overloaded; and if it is determined that the available amount of the second storage area is greater than the predefined memory parameter, determining that the memory resources are not overloaded.

22. A method as recited in claim 19, further comprising:

determining whether the predefined minimum time is set to zero, wherein the other determinations are performed when the predefined minimum time is not set to zero and are not performed when the predefined minimum time is set to zero; and activating the interface device if it is determined that the predefined minimum time is set to zero.

23. A method as recited in claim 19, further comprising programming the predefined minimum time.

24. A method as recited in claim 19, further comprising programming the predefined maximum time.

25. A method as recited in claim 19, wherein determining whether the processing resources are overloaded includes:

determining whether an unavailable percentage of processing resources is not greater than a predefined processor parameter; and if the unavailable percentage of processing resources is not greater than a predefined processor parameter, determining that the processing resources are not overloaded.

26. A computer readable medium containing program instructions for activating an interface that is coupled to a router having an associated processing unit and an associated memory device, the computer readable medium comprising:

computer readable code for determining whether the interface has been deactivated for more than a predefined minimum time;

computer readable code for determining whether the interface has been deactivated for more than a predefined maximum time if it is determined that the interface has been deactivated for more.than the predefined minimum time;

computer readable code for activating the interface if it is determined that the interface has been deactivated for more than a predefined maximum time;

computer readable code for determining whether processing or memory resources associated with the router are overloaded if the interface has not been deactivated for more than a predefined maximum time; and computer readable code for activating the interface device if it is determined that the memory device and the processing unit are not overloaded.

27. A computer readable medium as recited in claim 26, further comprising:

computer readable code for determining whether the predefined minimum time is set to zero, wherein the other determinations are performed when the predefined minimum time is not set to zero and are not performed when the predefined minimum time is set to zero; and computer readable code for activating the interface device if it is determined that the predefined minimum time is set to zero.

28. A computer readable medium as recited in claim 27, further comprising computer readable code for programming the predefined minimum time.

29. A computer readable medium as recited in claim 27, further comprising computer readable code for programming the predefined maximum time.

30. A router comprising:

a plurality of interfaces arranged to control data communication between the router and other network devices;

a processing unit arranged to invoke processes associated with the router, the processing unit being operable to:
schedule and initiate processes associated with the interface devices;
disable the first interface device when a first operating condition associated with the router is met; and
enable the first interface device when a second operating condition associated with the router is met and after the first interface has been disabled by the disabling mechanism wherein the second operating condition associated with the router is met when it is determined that the first interface has been disabled a predefined amount of time, wherein the second operating condition associated with the router is met when it is determined that the first interface has been disabled for at least a predefined minimum time and for more than a predefined maximum time and when a predefined amount of resources associated with the router are available for implementing a plurality of processes associated with the router; and a memory storage area arranged to facilitate the processes of the processing unit.

31. A router as recited in claim 30 wherein the second operating condition associated with the router is met when it is determined that the first interface has been disabled for at least a predefined minimum time and for more than a predefined maximum time.

32. A router as recited in claim 30 wherein the resources are selected from a group consisting of processing and memory resources.

33. A method for enabling a first one of a plurality of interfaces associated with a router comprising:

determining when a first predefined operating condition is met, wherein the first predefined operating condition is met when it is determined that the first interface has been disabled for a predefined time; and enabling the first interface when the first predefined operating condition is met, wherein the first predefined operating condition is met when it is determined that the first interface has been disabled for a predefined time and when a predefined amount of memory resources are available for implementing a plurality of processes on the router.

34. A method as recited in claim 33, wherein the predefined amount of memory resources is programmable.

35. A computer readable medium containing program instructions for enabling a first one of a plurality of interfaces associated with a router comprising:

computer readable code for determining when a first predefined operating condition is met, wherein the first predefined operating condition is met when it is determined that the first interface has been disabled for a predefined time; and computer readable code for enabling the first interface when the first predefined operating condition is met, wherein the first predefined operating condition is met when it is determined that the first interface has been disabled for a predefined time and when a programmable predefined amount of memory resources are available for implementing a plurality of processes on the router.

* * * * *